Feb. 7, 1933. C. R. HADEN 1,896,403
PROCESS OF MAKING LIME FROM OYSTER SHELLS
Filed Aug. 29, 1930

C. R. HADEN, Inventor
Jesse R. Stone
& Lester B Clark
By Attorneys

Patented Feb. 7, 1933

1,896,403

UNITED STATES PATENT OFFICE

CECIL RHEA HADEN, OF HOUSTON, TEXAS, ASSIGNOR TO THE HADEN LIME COMPANY, OF HOUSTON, TEXAS, A CORPORATION OF TEXAS

PROCESS OF MAKING LIME FROM OYSTER SHELLS

Application filed August 29, 1930. Serial No. 478,596.

The invention relates to the process of producing lime by calcining of oyster shells.

One of the objects of this invention is to devise a process of treating and calcining oyster shell so as to obtain therefrom a lime containing a minimum amount of impurities.

Another object of the invention is to provide an apparatus and equipment whereby the process may be successfully carried on.

Another object of the invention is to devise a process for burning the shells whereby the dangers of over-burning and under-burning are very materially reduced.

Another object of the invention is to provide a means whereby the impurities in the shells may be removed so that when the shell is passed to the kiln it will be practically free of adhering impurities.

Still another object of the invention is to devise a process of obtaining lime of a high degree of purity from oyster shells by a simple and economical procedure.

One of the principal objects of the invention is to so clean the oyster shells and prepare them for burning that all impurities will be practically eliminated.

Other and further objects of the invention will be readily apparent to those skilled in the art to which the invention appertains when the following description is considered in connection with the accompanying drawing wherein.

Figure 1:
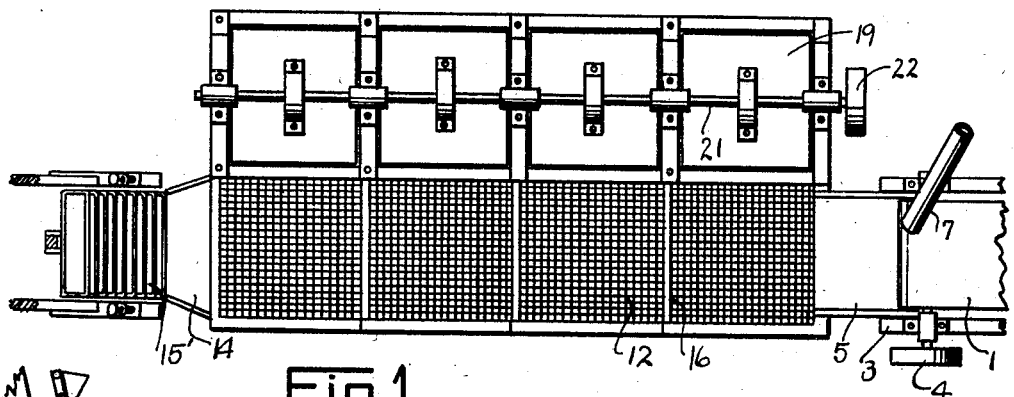
Fig. 1 is a top plan view of one form of cleaning apparatus which may be used in connection with the invention.

It is understood that heretofore attempts have been made to produce lime from oyster shells but it is understood that these prior methods did not involve the subject matter of the present invention and failed in that an impure lime was produced and such lime was unfit for use as a chemical reagent in many commercial industries. It has been found by experiment that the production of lime, in a sufficiently pure state so that it is suitable for use as a chemical reagent, must be carried on by an exact procedure and, after considerable experimentation, the present process has been evolved and results in a lime of a high degree of purity which readily adapts itself for use in manufacturing bleaching powder; for dehydration purposes; grease making; oil refining; varnish manufacture; water purification and many other processes requiring lime of high purity. One of the very essential steps in the production of lime from oyster shell is in even distribution of the heat so that portions of the shell are not over-burned or under-burned. Another step which is very important is the cleaning of the shells in order to remove all impurities therefrom before they are passed to the kiln for burning.

In the processes used heretofore in the attempted production of lime from oyster shells it is understood that solid or liquid fuels were used as a source of heat. Such fuels, however, when burned resulted in solid residues remaining after combustion. Such residues of necessity became intimately mixed or combined with the shell which was being burned and in this manner contaminated the final product. The present invention, however, contemplated the use of a gaseous fuel which will leave no residue to contaminate the product.

Commercial supplies of oyster shells occur in reefs and are usually removed by mechanical dredging equipment. Such removal obviously picks up impurities which have accumulated with the shells and considerable quantities of mechanically trapped silt and sand are included with the shells. In practicing the present invention it is essential that this silt and sand be almost entirely removed in order to obtain a sufficiently pure product. Accordingly a rotary screen is employed with the dredging equipment so that a majority of the silt and sand is removed at the time the shells are dredged from the reef. It has been found, however, that small deposits of sand and silt are included in the shell structure of the larger shells and upon breaking or crushing of these shells these deposits of sand and silt are loosened and will be readily removable by a washing operation. It is also necessary in the practicing of the invention that the shells be reduced to a substantially uniform size or thickness before they are passed to the kiln in order that all portions of the shell may be subjected to the same period of heating and at the same temperature in order to obtain a uniform product. With this in mind the next step of the invention is to run the shells through a crusher which will govern the maximum thickness of shell which will be discharged therefrom. Beyond the crusher the shell will be run over a screen in order to remove the smaller particles which would otherwise be passed to the kiln and be over-burned during the calcining operation. After the smaller portions of shell have been removed the remaining parts are subjected to a washing operation to remove any deposits of sand and silt which have been opened up during the crushing step as well as any small particles which may be adhering to the shell portions.

It has been found that the removal of particles of shell of less than 3/8 of an inch in width is very satisfactory. However, I do not desire to be limited to this precise size as obviously by varying other conditions in the process the size of the shell to be utilized may be varied. From this last washing operation the shells are then passed to a kiln where they are subjected to heating treatment to drive off the moisture and decompose the calcium carbonate and other carbonates of the shell into oxides so as to produce a commercial lime which is practically free of impurities and has been found very satisfactory for any purpose for which lime of a high degree of purity is required.

Figure 2:
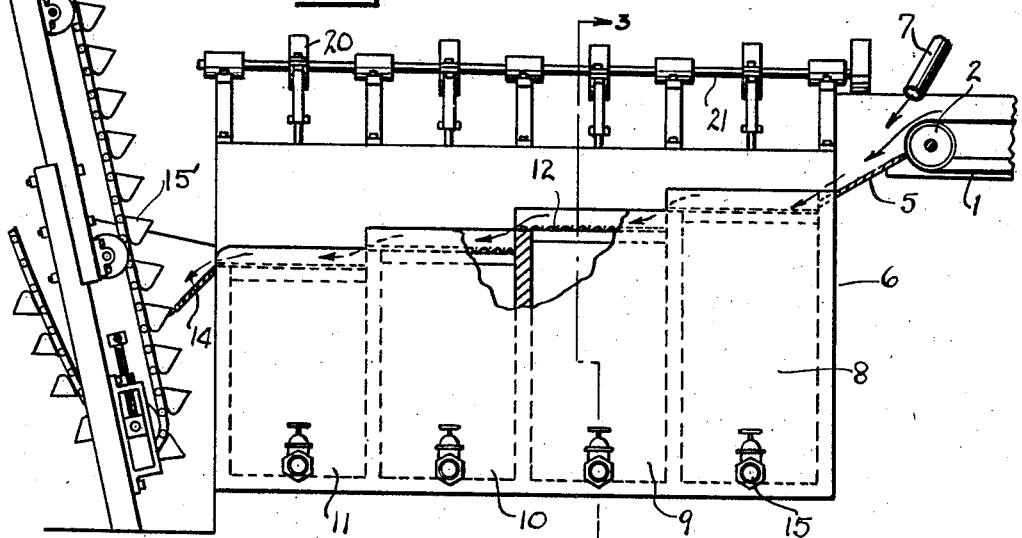
Fig. 2 is a side elevation thereof, certain parts being broken away for greater clearness.
Figures 3, 4:
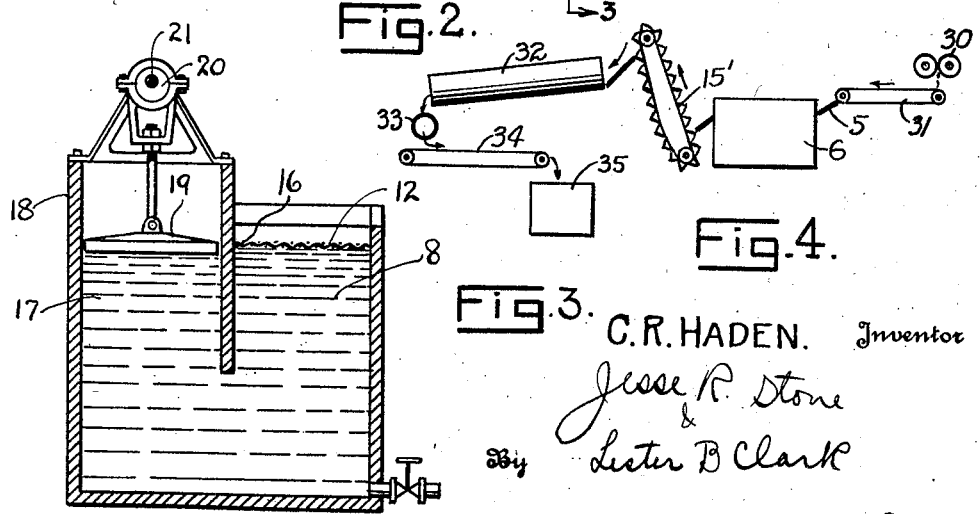
Fig. 3 is a transverse section taken on the line 3—3 of Fig. 1.
Fig. 4 is a schematic view of one form of the apparatus for practicing the process.

Fig. 4 of the drawing shows a schematic elevation of an apparatus which may be used in connection with the practice of the invention. This plan includes a crusher 30 which may be adjustable to limit the maximum size of pieces of shell which will pass therethrough. This crusher serves the purpose of breaking up the shells so that small pockets and deposits of silt and sand which have been trapped between the laminations of the shell will be readily removable. From the crusher rollers 30 the shell passes to a conveyor or screen 31 whereby it is moved to the chute 5 and the washer 6. It is intended that the small portions of shell may or may not be screened out while it is on the conveyor 31. The shell next passes to the washer which is disclosed in detail in Figs. 1 to 3 inclusive. Any small particles of shell which may pass through the screens 12 of the washer will, of course, be washed away so that all portions emerging from the washer will be sized between the minimum of the screens 12 and the maximum of the crusher. The conveyor 15' then moves the shell either to a storage bin where it may be retained until ready for burning in the rotary kiln 32 or, as shown in Fig. 4, it may pass directly from the conveyor 15' to the rotary kiln 32.

As the shells are being burned any moisture is driven off in the kiln 32 so that the shells are calcined and if no foreign materials are present a pure lime results. The calcined material is discharged from the kiln 32 to a rotary cooler 33 and a conveyor belt 34 and thence to a storage tank 35. It is intended that Fig. 4 is merely a schematic showing of one form of apparatus which may be used in the practice of the invention and obviously some of the steps may be interchanged if desired but it has been found that a very satisfactory lime is produced if the steps are carried on in accordance with this description and the principal advantage is that a high quality of lime is produced due to the uniform size of the pieces of shell so that when these pieces of shell are subjected to the heat in the kiln they will all be burned uniformly as they are all substantially the same thickness, the smaller pieces having been removed in the washer.

In order that the washing step may be clearly understood I have disclosed in Figs. 1 to 3, inclusive, the details of the washer 6 and in Fig. 1 I have shown the end of an ordinary belt conveyor 1 as running over a roller 2, having a bearing within the frame 3 and operated through means of power supplied to the pulley 4. From the belt the shell is discharged over a chute 5 to the washer 6. Water or other cleaning fluid may be discharged upon the shell as it passes over the chute 5 through a discharge pipe indicated diagrammatically at 7.

The cleaner 6 is made up of a plurality of separate chambers 8, 9, 10 and 11, each succeeding chamber being slightly lower in height than is the preceding one. The upper end of each chamber is covered by a wall of foraminated material 12, which may be woven wire or perforated metal as desired. The shell is carried over these screened areas by the force of the flushing fluid washing down from one screen to the next to discharge at last over an outlet chute 14.

Each of the chambers 8 to 11, inclusive, have an outlet 15 adjacent the lower end thereof through which the water carrying sediment and impurities from the shell may be carried away. These valves may be adjusted to allow a discharge therefrom at the proper rate. Adjacent to each of the chambers and separated therefrom by a partition 16 is a connecting chamber 17. As will be noted from Fig. 3, the partition 16 is spaced at its lower end from the bottom wall of the chamber so that water may flow around from one chamber to another beneath the partition. The chamber 17 has its walls 18 projecting above the level of the tanks or containers 8 to 11 inclusive and each chamber has a dasher 19 therein, which acts as a piston resting upon the top of the liquid therein. I have shown these pistons or dashers as being rectangular in shape and fitting loosely within the chamber. Each dasher is mounted at its upper end upon an eccentric 20, mounted upon a shaft 21 in such manner that when the shaft 21 is rotated a reciprocating motion is given to the dasher. The shaft 21 is journaled in supports upon the upper wall of each chamber and may be rotated in any desired manner such as by means of the pulley 22 thereon.

In the operation of this cleaner, the smaller particles of sand and crushed shell, together with silt and other impurities, is rinsed away from the shell into the chambers 8 to 11 inclusive. This action is facilitated through the action of the dashers 19, which by reciprocating cause the surging of the water in the tanks 8 to 11, inclusive, backward and forward through the screen and the shell to carry away and eliminate the aforesaid impurities. As the shell is discharged through the outlet 14 it will be received upon the conveyor 15' and carried to the kiln to be burned or to a container whereby the lime may be stored prior to burning.

When the lime is to be burned I prefer to employ a rotary kiln of usual construction, the kiln being inclined from one end to the other and rotatable to agitate the pieces of shell during the process of burning. The heat employed is preferably from a gas burner whereby the heat may be carried from one end to the other of the rotary kiln. The shell after being cleaned is much more effectively burned in its passage through the kiln. The dust and other impurities which would usually interfere with the proper burning of the charge have been done away with so that a more effective burning may be obtained. It has been found that the removal of the small particles of shell in the washer materially improves the process because these small particles, if passed into the kiln, are readily calcined, and, in the tumbling operation, due to the rotation of the kiln, these small particles are pulverized by the larger pieces, forming a dusty material, and the dust thus formed arises in the kiln due to the draft through the kiln. This dust hinders the proper heat transfer to the shells and affects the burning of the larger pieces. Thus in the present process no such difficulty occurs as the smaller particles are absent. It is also found that after being thoroughly cleaned in the manner described the lime produced by the burning of the shell is practically pure, with little, if any, foreign ingredients therein. I am enabled, by this fairly inexpensive process, to produce a quality of lime which may be employed in the production of paints and varnishes, for sugar refining, paper making, gas scrubbing, water softening and the like, and no further treatment or purifying of the lime will be necessary.

It is understood that various attempts have been made to produce lime from oyster shells but in each of these attempts an inferior product has been produced due to the fact that shells were not reduced to a uniform size before they were subjected to the burning operation and also due to the fact that the impurities were not removed prior to burning, and also that impurities were introduced during the burning operation by the accumulation of solid products during combustion of the fuel. In view of the careful analysis which has been resorted to by this applicant and the fact that an unusually high-grade lime, available for all chemical uses, has been produced it is believed that a simple, economical and commercially advantages process is being devised.

The invention has been described as applied to oyster shells but it is intended that clam or other types of marine shells may be treated.

What I claim as new is:

1. A process of making lime from oyster shells including passing the shells thru a crusher to limit the maximum thickness, passing the crushed shell over a screen to limit the minimum size, washing the screened shells, passing them to a rotary kiln, heating the kiln with a fuel giving off no solid product in its combustion, and cooling the calcined product.

2. A process of making lime including washing and crushing oyster shells, screening and washing the crushed shells to eliminate small particles and to remove deposits of foreign material opened by the crushing, and burning the remaining shell portions in a kiln to convert them from carbonates to oxides.

3. A process of making lime including washing, crushing and screening oyster shells to reduce all the pieces to a substantially uniform size, removing all the small particles from among the pieces and calcining these pieces in a rotary kiln.

4. A process of making lime including washing, crushing and screening oyster shells to reduce all the pieces to a substantially uniform size, removing all particles of less than a predetermined size, and calcining these pieces in a rotary kiln where they are free from contaminating materials.

5. A method of making lime including crushing oyster shells to a uniform size so that they may be subjected to a uniform heat, washing the crushed shells to eliminate deposits of foreign material opened by the crushing operation, sizing the washed shells, and burning the shells for a predetermined period to produce lime.

6. A process of making oyster shell lime including sizing the shells between a predetermined minimum and maximum, washing the shells to remove adhering substance, calcining the sized shells while the shells are being agitated in the presence of a non-contaminating heating media, and cooling the calcined product.

7. A method of converting shells to lime including sizing the shells between a predetermined maximum and minimum so that the maximum thickness of shell will be determined, burning the shells for a time interval sufficient to insure calcining of a shell of at least the maximum thickness so that there will remain no unburned portion in the shells.

8. A method of converting shells to lime including sizing the shells between a predetermined maximum and a predetermined minimum so that the minimum size of shell will be determined, burning the shells for such a time interval as will insure calcining of the maximum shells but which is insufficient to overburn the predetermined minimum shell so that the burning is not retarded by any overburned material eroded from the shells during the burning period.

9. A method of converting shells from carbonates to oxides by burning including sizing the shells between predetermined limits so that there will be no overburning or under-burning, and burning the shells while agitating them for a period sufficient to decarbonate the maximum thickness of shell which period is insufficient to overburn the minimum size of shell.

In testimony whereof I hereunto affix my signature this 23 day of August, A. D. 1930.

CECIL RHEA HADEN.